Nov. 19, 1968   L. R. RICE   3,412,312
SERIES CONNECTED, SLAVE TRIGGERED, CONTROLLED
RECTIFIER ASSEMBLIES
Filed Nov. 22, 1966

WITNESSES
Bernard R. Gregory
James F. Young

INVENTOR
Leslie R. Rice
BY
A. Samuel Ott
ATTORNEY

United States Patent Office 3,412,312
Patented Nov. 19, 1968

3,412,312
SERIES CONNECTED, SLAVE TRIGGERED,
CONTROLLED RECTIFIER ASSEMBLIES
Leslie R. Rice, Pittsburgh, Pa., assignor to Westinghouse
Electric Corporation, Pittsburgh, Pa., a corporation of
Pennsylvania
Filed Nov. 22, 1966, Ser. No. 596,261
8 Claims. (Cl. 321—11)

The present invention relates to rectifier assemblies and, more particularly, to rectifier assemblies including a plurality of controlled rectifier devices and wherein the devices are protected against overvoltage destruction.

In order to convert high voltage alternating current to high voltage direct current, rectifier assemblies including a plurality of series connected silicon controlled rectifiers are commonly used. These assemblies are also commonly used in inverter apparatus as the legs of a bridge array. The assembly may include a number of series stacks of controlled rectifiers each stack having 10 or more devices depending on the power requirements and device ratings. By employing the series chain of controlled rectifiers, the voltage across each of the devices is reduced accordingly; thus lower voltage rating devices may be utilized. To minimize the gate control required to gate on the various controlled rectifiers, slave firing is usually employed. That is, one of the controlled rectifiers of the string is gated on and in response to the conduction of this device the other devices are gated on. Slave firing is usually accomplished by connecting a capacitor between the gate electrodes of adjacent devices in the string. Thus, by gating on a selected control rectifier a discharge path is provided for capacitor connected between that device and the next adjacent device to thereby turn on the adjacent device. The gating on signal is thus propagated up the chain of devices as each of the devices is turned on. A resistor is usually connected across each of the controlled rectifiers in an attempt to equalize the voltage appearing across each of the devices and thereby prevent an excessive voltage appearing across any individual device of the stack.

A serious problem in series connected rectifier assemblies is that a voltage in excess of the controlled rectifier rating may appear across any one of the devices of the chain which may cause overvoltage destruction of the device. When a voltage exceeding the voltage rating of the device appears thereacross when the controlled rectifier is in its non-conductive state, the device goes into what is commonly called two-terminal operation with current flowing from anode to cathode thereof independent of any gating signal applied to the gate electrode thereof. This type of operation usually destroys the rectifier. Due to the usual slave firing connection of the series chain, if one of the controlled rectifiers of the chain goes into two-terminal operation due to an overvoltage appearing thereacross, the devices appearing above this device in the chain will be turned on. Also, because of time delays the overvoltage condition may appear across other devices causing them also to go into two-terminal operation. After the destruction of one or more devices in the chain, during the next half-cycle of the positive excursion of the alternating current applied across the stack, an excessive voltage will most likely be applied across the remaining controlled rectifiers of the series connection which may cause the destruction of the entire series chain over repeated positive half-cycles. Moreover, even under normal operation of the various controlled rectifiers of the stack, if one of the devices fails to fire due to some malfunction, an overvoltage condition may exist thereacross causing this device to be rendered conductive in its two-terminal mode. The subsequent positive half-cycles of the alternating voltage appearing across the stack may be excessive for the remaining devices and cause the eventual destruction thereof.

It is therefore an object of the present invention to provide a new and improved rectifier assembly including a plurality of controlled rectifiers which are protected against destruction.

It is a further object to provide a new and improved rectifier assembly including a plurality of controlled rectifiers which are protected against destruction and wherein an improved slave firing technique is employed.

It is a further object to provide a new and improved rectifier assembly utilizing a plurality of controlled rectifiers which are protected against destruction and wherein each of the controlled rectifiers is gated on substantially at the same time.

Briefly, the above-cited objects are accomplished by providing a rectifier assembly including a plurality of rectifier units operatively connected across a source of alternating potential. Each of the units includes: a controlled rectifier having an inductive device connected in the anode circuit thereof, a voltage divider connected across the device and a breakdown device operatively connected between the voltage divider and the gate electrode of the controlled rectifier. Whenever a predetermined voltage is exceeded across the controlled rectifier, the breakdown device supplies a gating signal to the controlled rectifier device causing it to be rendered conductive and preventing it from overvoltage destruction. The various controlled rectifiers of the rectifier units are coupled via the inductive devices so that each of the controlled rectifier devices may be gated on in response to the gating on of a selected one of the controlled rectifiers of the rectifier assembly.

These and other objects and advantages of the present invention will become more apparent when considered in view of the following specification and drawings in which.

Figure 1:
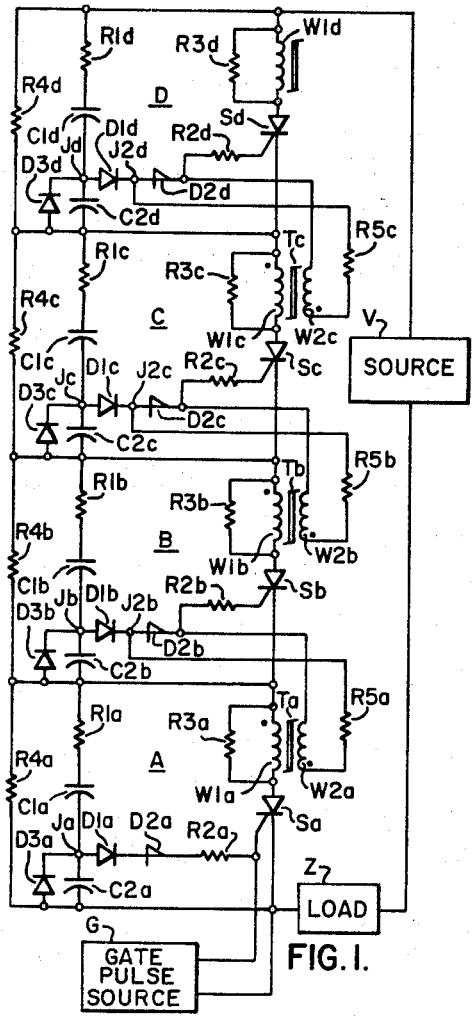
FIGURE 1 is a schematic diagram of one embodiment of the present invention.

Referring to FIG. 1 a rectifier assembly is shown including four rectifier units A, B, C and D. Each of the rectifier units includes the controlled rectifiers $Sa$, $Sb$, $Sc$ and $Sd$, respectively which may comprise silicon controlled rectifiers. Only four rectifier units are shown for the purpose of simplicity, while, of course, other similarly connected units could be utilized. A source of potential V is connected in series with a load Z and the series connection of the rectifier units A, B, C and D and may supply an alternating current output of a selected voltage and frequency. It should be noted that a DC source could be used with an alternating output being supplied to a load as would be the case with the rectifier assemblies being used as the legs of an inverter bridge.

Each of the rectifier units A, B, C and D is substantially identical except that the unit A has a gate pulse input supplied thereto from a gate pulse source G. The output of the gate pulse source G is connected between the gate and cathode electrodes of the controlled rectifier $Sa$. A primary winding $W1a$ of a saturable reactor $Ta$ is connected in the anode circuit of the controlled rectifier $Sa$. The inductive reactance of the winding $W1a$ acts to limit the rate of current rise through the anode-cathode circuit of the controlled rectifier $Sa$ and prevents high frequency oscillations during the turn-on of the device $Sa$. A voltage divider including a resistor $R1a$, a capacitor $C1a$ and a capacitor $C2a$ are connected in series respectively between the dotted end of the winding W1a and the cathode electrode of the controlled rectifier Sa. A junction Ja is formed between the capacitors C1a and C2a. The anode of a diode D1a is connected to the junction Ja, while its cathode is connected to the anode of a breakdown diode D2a. The cathode of the breakdown diode D2a is coupled through a resistor R2a to the gate electrode of the controlled rectifier Sa. The diode D2a is of the breakdown type and may comprise a Shockley diode. Once a voltage exceeding the breakdown voltage of the diode D2a is applied thereacross, it breaks down to permit the passage of current thereto. Before the breakdown voltage is reached the device blocks the passage of current therethrough.

A diode D3a is connected across the capacitor C2a, with its cathode electrode connected to the junction Ja. The diode D3a prevents reverse voltages from being impressed on the gate circuit of the controlled rectifier Sa. A resistor R3a is connected directly across the primary winding W1a to provide a resistive current path to the anode-cathode circuit of the controlled rectifier Sa when this device is gated on. A resistor R4a is connected from the dotted end of the winding W1a to the cathode-electrode of the controlled rectifier Sa and provides an AC path across the rectifier unit A. Resistors R4b, R4c and R4d are connected across rectifier units B, C and D, respectively. The resistors R4a, R4b, R4c and R4d act to equalize the voltage gradient across each of the rectifier units.

The rectifier units B, C, D are substantially similar in construction and function to the rectifier unit A except that they are coupled to the next lower rectifier unit through a secondary winding on the saturable reactor of the next lower rectifier unit. Thus, the saturable reactor Ta has a secondary winding W2a, which has its dotted end coupled through a resistor R5a to a junction point J2b at the cathode-anode connection of the breakdown diode D1b and D2b. The undotted end of the winding W2a is connected to the cathode of the breakdown diode D2b. In a similar fashion, the secondary winding W2b of saturable reactor Tb is coupled to the gate electrode of the controlled rectifier Sc, while the secondary winding W2c of the saturable reactor Tc is coupled to the gate electrode of the controlled rectifier Sd.

The normal three-terminal operation of the rectifier assembly is such that the controlled rectifier Sa is turned on by the application of a positive polarity pulse to the gate electrode thereof from the gate pulse source G. With the controlled rectifier Sa being turned on the capacitors C1a and C2a of discharge through the anode-cathode circuit thereof. The resistor R3a shunting the winding W1a provides a resistive current path therethrough so that sufficient holding current may be supplied to the anode-cathode circuit of the controlled rectifier Sa within a relatively short time even though the inductive reactance of the winding W1a prevents the rapid build up of current therethrough. The resistor R1a in series with the capacitor C1a acts as a damping resistor to prevent resonance between the capacitance of the circuit and the inductance found in the winding W1a. This prevents the controlled rectifier from being turned off immediately once it has been gated on.

Slave firing in the rectifier assembly shown in FIG. 1 occurs in the following manner. Up until saturation the saturable reactor Ta supplies an output through the secondary winding W2a as current builds up in the primary winding W1a thereof. This output is coupled to the breakdown diode D2b. The output of the winding W2a increases until the breakdown voltage of the breakdown diode D2b is exceeded which applies a signal therethrough and through the resistor R2b to the gate electrode of the controlled rectifier Sb which gates on this device. The resistor R2b is selected to permit the maximum gate drive within the limits of the controlled rectifier.

The gating on of the controlled rectifier Sb causes the capacitors C1b and C2b of the rectifier unit B to discharge through the anode-cathode circuit of the controlled rectifier Sb and thereby energizes the primary winding W1b of the saturable reactor Tb, which, in turn, supplies an output via the secondary winding W2b thereof to the rectifier unit C. When the output of the winding W2b exceeds the breakdown level of the breakdown diode D2c, this diode breaks down and supplies a gating signal to the controlled rectifier Sc which is rendered conductive in response thereto. In response to the conduction of the controlled rectifier Sc an output is provided from the saturable reactor winding W2c which gates on the controlled rectifier Sd of the rectifier unit D. With the rectifiers Sa, Sb, Sc and Sd all turned on, a unidirectional conductive path is provided across the rectifier assembly for the AC source V. The saturation of the saturable reactors Ta, Tb, Tc and Td causes a substantially low impedance path through each of the rectifier units A, B, C and D.

Figure 2:
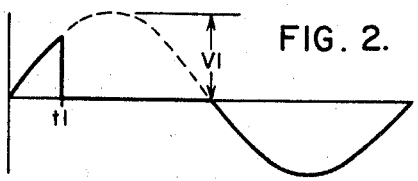
FIG. 2 is a waveform diagram used in explaining the operation of the present invention.

For the normal three-terminal operation of the controlled rectifiers as shown in FIG. 1, a waveform similar to that shown in FIG. 2 appears across each of the devices. The sinusoidal waveform applied to each of the controlled rectifiers which has a peak-to-peak magnitude V1 as shown in FIG. 2. The magnitude of V1 is selected to be less than the breakdown voltage of the controlled rectifier. The magnitude of the voltage V1 being less than the breakdown voltage of the individual controlled rectifiers in order to render any of the controlled rectifiers conductive it is necessary that a gating pulse be applied to the gate electrode thereof. At the time t1, in FIG. 2, a gating pulse is supplied to the gate electrode of a given controlled rectifier. The pulse would be supplied either from the gate pulse source G to the gate electrode of the controlled rectifier Sa or through the respective windings W2a, W2b or W2c to the controlled rectifiers Sb, Sc or Sd, respectively. At the time t1, when the controlled rectifier is turned on, the voltage thereacross goes to substantially zero for the remainder of the positive cycle of the alternating waveform as shown in FIG. 1. During the negative half-cycle of the waveform a reverse voltage will appear across the device. The controlled rectifiers may then be gated on during the next positive half-cycle in response to gating pulses being applied to the gate electrodes thereof.

The rectifier units A, B, C and D as shown in FIG. 1 are so designed to protect the controlled rectifiers thereof from destruction due to two-terminal operation when the voltage across the individual devices exceeds the breakdown potential thereof. This protection is provided through the use of the voltage divider circuit and the breakdown diode in each of the rectifier units. This operation will be discussed with reference to the rectifier unit A; however, the other rectifier units B, C and D function in an identical manner.

If the forward voltage of the controlled rectifier Sa exceeds the rating of the device, without a gating signal being applied to the gate electrode thereof, the device is rendered conductive from anode to cathode in such a mode as to destroy the device. However, in the circuit of FIG. 1, whenever the voltage across the controlled rectifier Sa exceeds a predetermined value, the breakdown diode D2a has its breakdown voltage exceeded and in response thereto applies a gating pulse to the controlled rectifier Sa which renders it conductive prior to the two-terminal operation thus preventing the destruction of the device. The magnitude of the resistor R1a, the capacitors C1a and C2a of the voltage divider are so selected that the voltage developed at the junction Ja between the capacitor C1a and C2a will cause the diode D2a to breakdown whenever the voltage across the controlled rectifier Sa exceeds a predetermined value which is less than the destructive breakdown value of the device.

Figure 3:
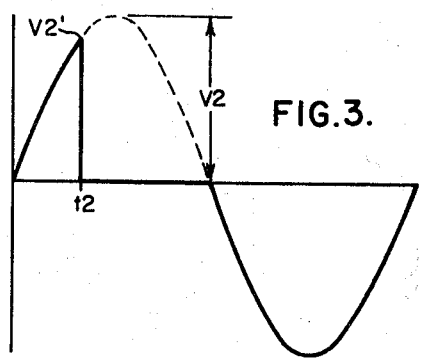
FIG. 3 is a waveform diagram used in explaining the operation of the present invention.

FIG. 3 shows the operation of a rectifier unit whenever the voltage applied across the controlled rectifier thereof exceeds its breakdown value. In FIG. 3 assume that the peak-to-peak voltage value V2 is in excess of the forward blocking capacity of the controlled rectifier Sa. At the time t2 the voltage across the controlled rectifier Sa has reached a value V2' which is assumed to be somewhat less than the breakdown of the controlled rectifier. At the time t2 the voltage at the junction Ja of the voltage divider of the rectifier unit A is sufficient to breakdown the breakdown diode D2a and to gate on the controlled rectifier Sa. Thus, before the controlled rectifier Sa has an opportlnity to go into a destructive two-terminal mode of operation, a sufficient voltage is developed across the breakdown diode D2a which causes it to breakdown and supply a gating pulse to the gate electrode of the controlled rectifier Sa rendering this device conductive and preventing it from a destructive breakdown.

As can be seen in FIG. 3, after the voltage V2' has been reached, the controlled rectifier is conductive with substantially zero forward voltage appearing between anode and cathode during the remainder of the positive half-cycle. Each of the rectifier units shown in FIG. 1 will operate as described with reference to the controlled rectifier unit A. Whenever the voltage across any of the devices Sa, Sb, Sc or Sd exceeds a predetermined value, the associated breakdown diode S2a, S2b, S2c or S2d breaks down and will turn on the particular controlled rectifier having the excessive voltage appearing thereacross and will thereby protect the device against destruction due to the excessive voltage.

Figure 4:
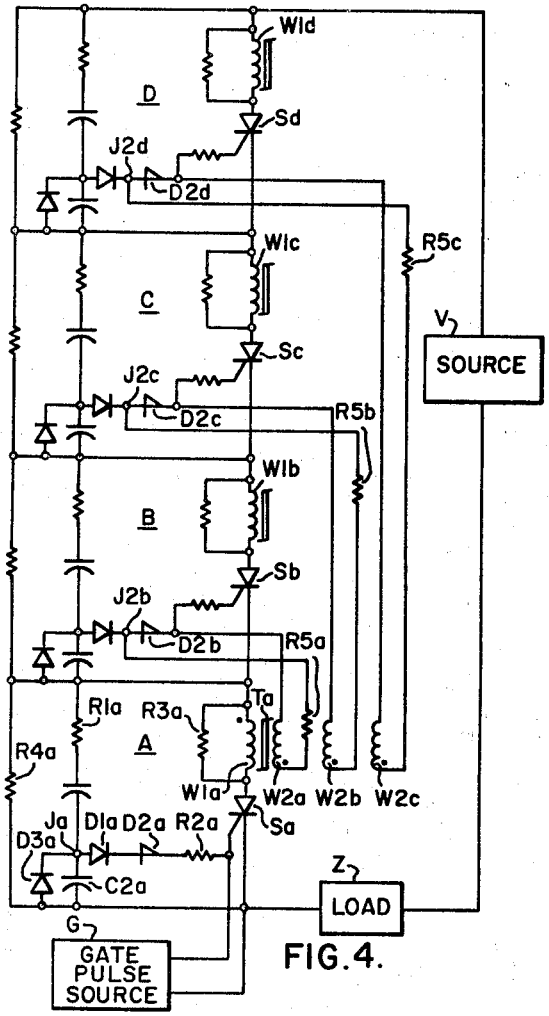
FIG. 4 is a schematic diagram of another embodiment of the present invention.

FIG. 4 shows another embodiment of the present invention in which each of the controlled rectifiers Sa, Sb, Sc and Sd of the series chain are gated on substantially at the same time as the gating on of the controlled rectifier Sa. The circuitry for each of the rectifier units as shown in FIG. 4 is substantially the same as shown in FIG. 1 except that the secondary windings W2b and W2c have been removed from being inductively coupled to the primary winding W1b and W1c of reactors Tb and Tc, respectively, and have now been inductively coupled to the primary winding W1a of the saturable reactor Ta as shown in FIG. 4. The windings W1b, W1c and W1d serve as anode reactors for their respective controlled rectifiers Sb, Sc and Sd to limit the rate of rise of current therethrough. Similarly, the winding W1a serves as an anode reactor for the controlled rectifier Sa; however, it also serves as the primary winding of the saturable reactor Ta. Saturable reactor Ta includes the three secondary windings W2a, W2b and W2c. The dotted end of the winding W2a is connected through a resistor R5a to the junction point J2b at the anode of the breakdown diode D2b. The undotted end is connected to the cathode of the diode D2b. The dotted end of the winding W2b is connected through the resistor R5b to the junction point J2b at the anode of the breakdown diode D2b, and the undotted end is connected to the cathode of the diode D2b. The dotted end of the winding W2b is connected through the resistor R5b to the junction point J2c at the anode of the breakdown diode D2c, while the cathode thereof is connected to the undotted end of the winding W2b. The dotted end of the winding W2c is connected through the resistor R5c to the junction J2d at the anode of the breakdown diode D2d, and the cathode of the diode D2d is connected to the undotted end of the winding W2c.

It should be noted that the secondary windings W2a, W2b and W2c are each inductively coupled to the primary winding W1a of the saturable reactor Ta. Thus, whenever the controlled rectifier Sa is gated on by a pulse from the gate pulse source G, the passage of current in the primary winding W1a will induce current in each of the secondary windings W2a, W2b and W2c. A voltage will be thus developed across the breakdown diodes D2b, D2c and D2d associated, respectively, with the windings W2a, W2b and W2c. Whenever the breakdown potential of each of the breakdown diodes D2b, D2c and D2d is exceeded, these diodes will breakdown and apply a gating on pulse to the respective controlled rectifiers Sb, Sc and Sd, which will gate on each of these controlled rectifiers at substantially the same time. Thus, the rectifier assembly as shown in FIG. 4 responds to the conduction of the first controlled rectifier Sa to be gated on rather than waiting for a gating signal to be propagated along the chain from one controlled rectifier to the next adjacent one. Through the use of the multiple secondary windings W2a, W2b and W2c on the saturable reactor Ta, the slave firing time is substantially reduced since even the most removed controlled rectifier from the first controlled rectifier Sa is gated on at substantially the same time as the next adjacent controlled rectifier. The operation of FIG. 4 is otherwise the same as that of the circuitry of FIG. 1, with the voltage divider and breakdown diodes of each of the rectifier units responding to any overvoltage condition existing across any of the controlled rectifiers Sa, Sb, Sc or Sd to breakdown and gate on the associated controlled rectifier.

Although the present invention has been described with a certain degree of particularity it should be understood the present disclosure has been made only by way of example and numerous changes in the details of circuitry and the combination and arrangement of parts and components can be resorted to without departing from the spirit and the scope of the present invention.

I claim as my invention:

1. A rectifier assembly operative with a source of alternating potential, comprising:
   a plurality of rectifier units operatively connected in series across said source,
   each of said units including:
   a controlled rectifier device having anode, cathode and gate electrodes,
   an inductive device operatively connected in the anode circuit of said controlled rectifier device,
   a voltage divider operatively connected across the anode-cathode circuit of said controlled rectifier device, and
   a breakdown device operatively connected between said voltage divider and the gate electrode of said controlled rectifier device so that when the voltage across said anode-cathode circuit of said controlled rectifier device exceeds a predetermined value said breakdown device breaks down and gates on said controlled rectifier device;
   pulse means for supplying a gating pulse to the gate electrode of a selected one of said controlled rectifier devices to gate on that controlled rectifier device in response thereto; and
   coupling means inductively coupling the inductive device in the rectifier unit including said selected controlled rectifier device to the gate electrode of at least one other of said controlled rectifier devices so as to gate on the coupled controlled rectifier device in response to the gating on of said selected controlled rectifier device.

2. The rectifier assembly of claim 1 wherein:
   said voltage divider includes a pair of capacitors connected in series and having a junction therebetween,
   said breakdown device operatively connected between said junction and the gate electrode of said controlled rectifier device.

3. The rectifier assembly of claim 2 wherein:
   said coupling means inductively coupling the inductive device in the rectifier unit including said selected controlled rectifier device to the gate electrode of the next adjacent controlled rectifier device and further inductively coupling adjacent controlled rectifier devices from the inductive device of a rectifier unit to the gate electrode of the next adjacent controlled rectifier device so that said plurality of controlled rectifier devices are slave fired in response to the initial gating on of said selected controlled rectifier device.

4. The rectifier assembly of claim 2 wherein:
   said coupling means inductively coupling the inductive device in the rectifier unit including said selected controlled rectifier device to the gate electrode of each of the other of said controlled rectifier devices so that each of the other of said controlled rectifier devices are gated on substantially at the same time in response to the gating on of said selected controlled rectifier device.

5. The rectifier assembly of claim 2 wherein:
the inductive device of at least the rectifier unit including said selected controlled rectifier device comprising a saturable reactor including a primary winding connected in the anode circuit of said selected controlled rectifier device,
said coupling means including a secondary winding of said saturable reactor inductively coupled to the primary winding thereof and operatively connected to the gate electrode of another of said controlled rectifier devices so that the connected controlled rectifier devices will be gated on in response to the gating on of said selected controlled rectifier device.

6. The rectifier assembly of claim 2 wherein:
said inductive device includes a saturable reactor including a primary winding connected in the anode circuit of said controlled rectifier device,
said coupling means including a secondary winding of said saturable reactor inductively coupled to the primary winding in the same rectifier unit and operatively connected to the gate electrode of the next adjacent controlled rectifier device so that the plurality of control rectifier devices will be slave fired in response to the gating on of said selected controlled rectifier devices.

7. The rectifier assembly of claim 2 wherein:
the inductive device included in the rectifier unit including said selected controlled rectifier device comprising a saturable reactor including a primary winding connected in the anode circuit of said selected controlled rectifier device,
said coupling means including a plurality of secondary winding of said saturable reactor inductively coupled to the primary winding thereof and operatively connected to the gate electrodes of the controlled rectifier devices of the other of said plurality of rectifier units so that the plurality of controlled rectifier devices will each be gated on substantially at the same time in response to the gating on of said selected controlled rectifier device.

8. The rectifier assembly of claim 2 wherein:
said rectifier unit including a unidirectional device to isolate said gating pulse from said pair of capacitors of said voltage divider.

References Cited

UNITED STATES PATENTS

| | | | |
|---|---|---|---|
| 3,226,625 | 12/1965 | Diebold | 321—27 |
| 3,328,667 | 6/1967 | Shaneman | 321—11 X |

FOREIGN PATENTS

| | | |
|---|---|---|
| 914,268 | 1/1963 | Great Britain. |

OTHER REFERENCES

General Electric SCR Manual, "Slave Triggering of Series SCR's," 3rd ed., pp. 96, 97, TK2798, G4g, 1964, C.3.

LEE T. HIX, *Primary Examiner.*

W. H. BEHA, *Assistant Examiner.*